(No Model.)
J. P. HYDE.
URINAL.
No. 262,295. Patented Aug. 8, 1882.
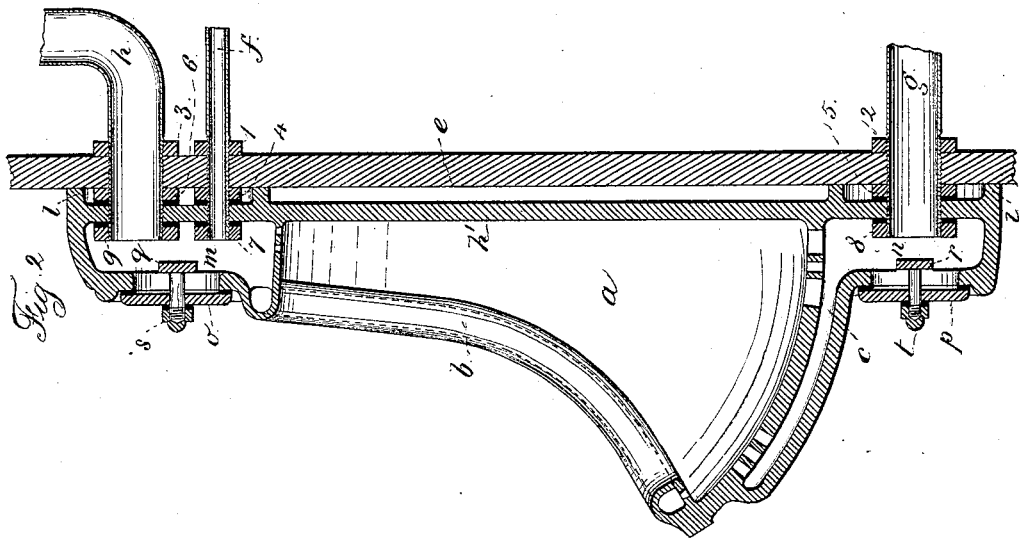
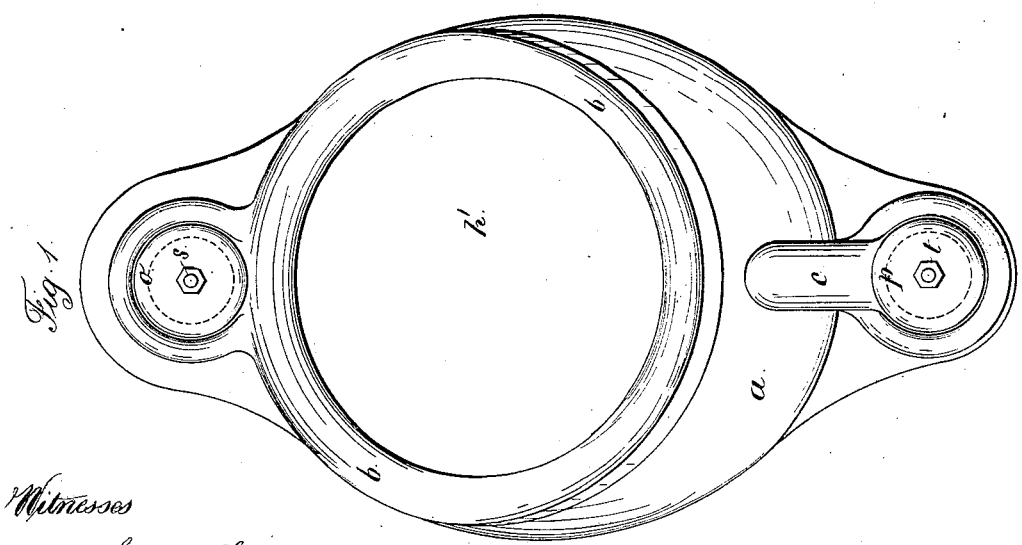
Witnesses
Chas H Smith
J. Hail
Inventor
James P. Hyde
by Lemuel W. Serrell
atty

UNITED STATES PATENT OFFICE.

JAMES P. HYDE, OF NEW YORK, N. Y.

URINAL.

SPECIFICATION forming part of Letters Patent No. 262,295, dated August 8, 1882.

Application filed March 27, 1882. (No model.)

*To all whom it may concern:*

Be it known that I, JAMES P. HYDE, of the city and State of New York, have invented an Improvement in Urinals, of which the following is a specification.

Urinals are generally fastened to a vertical slab of slate or marble, and the water used for washing out the same is supplied by a pipe at the top, and the waste passes off at the bottom by a pipe leading downwardly and carried back through the slab. In these cases the waste-pipe is objectionable in appearance, or else it is necessary to provide a shield for covering it up, and the urinal requires to be fastened to place by screws and flanges specially provided.

My invention is for covering up and rendering invisible the pipes, for dispensing with separate fastenings for the urinal, and for giving access to the pipes for cleaning the same, if necessary, and for ventilating the urinal.

In the drawings, Figure 1 is an elevation of the basin, and Fig. 2 is a section of the same.

The basin portion $a$, the hollow ring $b$, perforated for the passage of water into the basin, and the escape water-way $c$ at the lower side of the basin are to be of any desired size or character, and, being well known, do not require further description.

It is usual to have side flanges to the bowl or basin, by which to secure the same in place. I dispense with these, and fasten the urinal to the pipes.

$e$ represents a slab of marble, slate, or other material.

$f$ is the water-pipe, $g$ the waste or sewer pipe, and $h$ a ventilating-pipe. Each of these pipes passes through the slab $e$, and usually these pipes will be of brass or iron. They will be fastened to lead or other pipes behind the slab. Each pipe has a screw-thread cut upon its surface, and there are nuts 1 2 3 behind the slab, and 4, 5, and 6 upon the surface of the slab. By these nuts the pipes are held firmly to the slab. It will generally be preferable to place leather washers between the nuts and the slab. The holes in the slab for these pipes $h\,f\,g$ are in the same relative places as the holes in the back plate, $h'$, of the urinal, and the ends of the pipes project sufficiently to pass through the holes in the urinal and receive nuts 7 8 9 on the respective pipes, with washers of leather or rubber between the nuts and the porcelain back plate, $h'$, so that the urinal will be secured firmly by these nuts, and the parts are rendered water-tight, and risk of injury to the porcelain is avoided.

In order to allow the necessary space for the nuts 4 5 6, there is a rim at $l$ around the back of the urinal, which rests against the slab $e$, leaving a recess between the slab and the porcelain at the places where the nuts come. The rim will usually be ground or "slabbed" off flat, so as to rest evenly against $e$.

The nuts 7 8 9 will usually be circular, with milled edges, so as to be easily screwed on, and in order to allow for their insertion there are chambers at $m$ $n$ in the urinal, with holes that are large enough for the respective nuts to be passed in; and these holes are afterward covered with porcelain or metal caps $o$ $p$, with cross-bars $q$ $r$ behind the openings, and bolts passing through the caps with nuts $s$ $t$, by which the respective caps are secured in place. There should be washers of leather or rubber between the backs of the caps and the surfaces of the urinal to form tight packings.

The chamber $m$ opens into the hollow ring $b$, so that water supplied by the pipe $f$ flows into the basin and washes the same. In consequence of the ventilating-tube $h$ passing into this same chamber, $m$, the water will all flow out of the chamber into the urinal when the supply is cut off, and little or none will be held in by atmospheric action. The openings through which the water has passed will then allow air and gases to enter the chamber $m$ and escape by the ventilating-pipe $h$.

The chamber $n$ is at the end of the escape water-way $c$, so that all liquid substances entering the basin will flow into said chamber $n$, and thence to the sewer or waste pipe; and if there is any obstruction in the waste-pipe it can be removed by taking off the cap $p$, which gives access to the waste-pipe without injury to any of the connections.

The pipes are entirely out of sight, and the basin can be removed or replaced with facility, if necessary, and when the pipes require cleaning or altering the urinal can be taken off, and there is no risk of breaking the same, whereas in the ordinary urinal the waste-pipe cannot be cleaned without risk of breaking the porcelain.

My improvements are available with urinals that pass into an angle, in which case it is preferable to make the connections at one of the flat sides, rather than in the angle.

I claim as my invention—

1. A urinal formed with a chamber below the basin portion, having two openings, one for the waste-pipe and the other for a removable cap, substantially as set forth.

2. A urinal formed with a chamber below the basin portion, having two openings at opposite sides, in combination with a waste-pipe passing into one of the openings and permanently connected, and a removable cap to close the other opening, substantially as set forth.

3. In a urinal, a back plate having openings for the water-supply and waste pipes, in combination with such pipes and nuts upon the same, whereby the urinal is supported by the said pipes and nuts, substantially as set forth.

4. The combination, with a urinal-basin having a back plate with openings for the respective pipes, and a chamber in the upper part of the urinal above the basin, of water-supply and ventilating pipes opening into such chamber, and nuts to secure the urinal to the pipes, substantially as set forth.

5. A urinal formed with a chamber in the upper part of the basin, having two openings, one at each side, one for receiving the supply water-pipe, the other for a removable cap, substantially as set forth.

6. In a urinal, a back plate having openings for the respective pipes, and chambers $m$ $n$ and passages $b$ $c$, having openings, substantially as specified.

7. A urinal having a back plate with openings for the supply water and ventilating pipes, and a chamber into which such pipes open, substantially as set forth.

Signed by me this 23d day of March, A. D. 1882.

JAMES P. HYDE.

Witnesses:
GEO. T. PINCKNEY,
WILLIAM G. MOTT.